(12) United States Patent
Hildreth

(10) Patent No.: US 10,146,298 B2
(45) Date of Patent: *Dec. 4, 2018

(54) ENHANCED HANDHELD SCREEN-SENSING POINTER

(71) Applicant: QUALCOMM Incorporated, San Diego, CA (US)

(72) Inventor: Evan Hildreth, Thornhill (CA)

(73) Assignee: QUALCOMM Incorporated, San Diego, CA (US)

( * ) Notice: Subject to any disclaimer, the term of this patent is extended or adjusted under 35 U.S.C. 154(b) by 505 days.

This patent is subject to a terminal disclaimer.

(21) Appl. No.: 14/881,040

(22) Filed: Oct. 12, 2015

(65) Prior Publication Data

US 2016/0041611 A1    Feb. 11, 2016

Related U.S. Application Data

(63) Continuation of application No. 12/756,373, filed on Apr. 8, 2010, now Pat. No. 9,189,082.
(Continued)

(51) Int. Cl.
*G09G 5/00* (2006.01)
*G06F 3/00* (2006.01)
(Continued)

(52) U.S. Cl.
CPC ............ *G06F 3/005* (2013.01); *G06F 3/0304* (2013.01); *G06F 3/0317* (2013.01);
(Continued)

(58) Field of Classification Search
CPC ...... G06F 3/005; G06F 3/0304; G06F 3/0317; G06F 3/0325; G06F 3/0346;
(Continued)

(56) References Cited

U.S. PATENT DOCUMENTS 7,379,566 B2    5/2008  Hildreth
7,486,297 B2    2/2009  Kouramanis et al.
(Continued)

FOREIGN PATENT DOCUMENTS

EP      1983406 A1     10/2008
JP      H07121293 A     5/1995
(Continued)

OTHER PUBLICATIONS

International Search Report—PCT/US2010/030345—ISA—dated Jun. 7, 2010.
(Continued)

*Primary Examiner* — Insa Sadio
(74) *Attorney, Agent, or Firm* — Kilpatrick Townsend & Stockton

(57) ABSTRACT

Enhanced handheld screen-sensing pointing, in which a handheld device captures a camera image of one or more fiducials rendered by a display device, and a position or an angle of the one or more fiducials in the captured camera image is determined. A position on the display device that the handheld device is aimed towards is determined based at least on the determined position or angle of the one or more fiducials in the camera image, and an application is controlled based on the determined position on the display device.

26 Claims, 11 Drawing Sheets

Related U.S. Application Data

(60) Provisional application No. 61/167,738, filed on Apr. 8, 2009.

(51) Int. Cl.

| | | |
|---|---|---|
| *G06F 3/03* | (2006.01) | |
| *G06F 3/0481* | (2013.01) | |
| *G06F 3/0482* | (2013.01) | |
| *G06K 9/20* | (2006.01) | |
| *G06K 9/22* | (2006.01) | |
| *G06F 3/0346* | (2013.01) | |

(52) U.S. Cl.
CPC .......... *G06F 3/0325* (2013.01); *G06F 3/0346* (2013.01); *G06F 3/0482* (2013.01); *G06F 3/04817* (2013.01); *G06K 9/2054* (2013.01); *G06K 9/22* (2013.01)

(58) Field of Classification Search
CPC .... G06F 3/04817; G06F 3/0482; G06F 1/163; G06F 21/84; G06F 2221/032; G06F 3/011; G06K 9/2054; G06K 9/22; A63F 13/26
See application file for complete search history.

(56) References Cited

U.S. PATENT DOCUMENTS

| | | |
|---|---|---|
| 2004/0201575 A1 | 10/2004 | Morrison |
| 2004/0247174 A1* | 12/2004 | Lyons ................. G06F 3/04845 382/154 |
| 2005/0116931 A1 | 6/2005 | Olbrich |
| 2007/0115254 A1 | 5/2007 | Wu |
| 2008/0001918 A1 | 1/2008 | Hsu et al. |
| 2008/0137913 A1 | 6/2008 | Hildreth |
| 2008/0174551 A1 | 7/2008 | Ishibashi |
| 2008/0273755 A1 | 11/2008 | Hildreth |
| 2009/0009469 A1* | 1/2009 | Hsu ....................... G06F 3/0325 345/158 |
| 2010/0259474 A1 | 10/2010 | Hildreth |

FOREIGN PATENT DOCUMENTS

| | | |
|---|---|---|
| JP | H08335136 A | 12/1996 |
| JP | 2001331269 A | 11/2001 |
| JP | 2002081909 A | 3/2002 |
| JP | 2002215321 A | 8/2002 |
| JP | 2006301915 A | 11/2006 |
| JP | 2007066080 A | 3/2007 |
| JP | 2007087100 A | 4/2007 |
| JP | 2007141199 A | 6/2007 |
| JP | 2007519989 A | 7/2007 |
| JP | 2008511877 A | 4/2008 |
| JP | 2008165800 A | 7/2008 |
| JP | 2008527572 A | 7/2008 |
| JP | 2008529147 A | 7/2008 |
| JP | 2008181198 A | 8/2008 |
| WO | WO-2005029407 A1 | 3/2005 |
| WO | WO-2005062273 A1 | 7/2005 |
| WO | WO-2006018776 A1 | 2/2006 |
| WO | WO-2006074290 A2 | 7/2006 |
| WO | WO-2006076557 A2 | 7/2006 |
| WO | WO-2006079939 A2 | 8/2006 |

OTHER PUBLICATIONS

Written Opinion—PCT/US2010/030345—ISA/EPO—dated Jun. 7, 2010.

Supplementary European Search Report—EP10762419—Search Authority—The Hague—dated May 30, 2016.

* cited by examiner

ENHANCED HANDHELD SCREEN-SENSING POINTER

CROSS-REFERENCE TO RELATED APPLICATIONS

This application is a continuation of pending U.S. patent application Ser. No. 12/756,373, filed on Apr. 8, 2010, and entitled, "Enhanced Handheld Screen-Sensing Pointer," which claims benefit of U.S. Provisional Application No. 61/167,738, entitled, "Enhanced Handheld Screen-Sensing Pointer," filed on Apr. 8, 2009, all of which are hereby incorporated by reference in their entirety.

FIELD

The present disclosure generally relates to user interfaces.

SUMMARY

According to one general implementation, a computer-implemented process includes capturing, by a handheld device, a camera image of one or more fiducials rendered by a display device, and determining a position or an angle of the one or more fiducials in the captured camera image. The process also includes determining a position on the display device that the handheld device is aimed towards based at least on the determined position or angle of the one or more fiducials in the camera image, and controlling an application based on the determined position on the display device.

In example implementations, the process may include controlling the display device to render the one or more fiducials within a user interface that represents output of the application being controlled. In addition, the one or more fiducials may include first and second fiducials, or first through fourth fiducials. The display device may be an LCD, plasma, DLP or CRT display. The handheld device may further include a laser pointer, and the camera image may captures laser light projected on the display device by the laser pointer. The one or more fiducials may further include one or more corners of a screen of the display device. The process may also include detecting the one or more corners of the screen based on a difference in brightness or hue. The one or more fiducials may make up a user interface control, may be a desktop icon such as a company logo, or video game reference part.

In some implementations, the process may include determining a type of the display device from among multiple, different display device types. In these implementations, the process may include selecting, from among multiple, different filtering techniques, a filtering technique that is suitable for the determined type of the display device and applying the selected filtering technique to the captured camera image.

In some examples, the process may include analyzing a user interface that represents output of the application being controlled for displayed elements that may be used as the one or more fiducials. In these examples, the process may include selecting the one or more fiducials from the displayed elements within the user interface that represents output of the application being controlled and transmitting, to the handheld device, a description of shape and position of the one or more fiducials selected from the displayed elements within the user interface that represents output of the application being controlled.

The process may also include accessing, from a memory of the handheld device, information identifying a shape or position of the one or more fiducials, or information identifying a timing of a display of the one or more fiducials rendered by the display device. The one or more fiducials may flash on the display device.

In some implementations, the process may include determining a type of the display device from among multiple, different display device types. In these implementations, the process may include selecting, from among multiple, different flashing techniques, a flashing technique that is suitable for the determined type of the display device and controlling the display device to flash the one or more fiducials on the display device using the selected flashing technique.

The process may also include determining an orientation of the handheld device based at least on the determined position or angle of the one or more fiducials in the camera image, where the application may be controlled further based on the determined orientation. The process may also include determining a distance or position of the handheld device, where the distance, position, or orientation of the handheld device may be determined with respect to the display device. The process may also include determining an identity of a user of the handheld device based on the determined position on the display device that the handheld device is aimed towards.

The process may also include capturing, by a second handheld device, a second camera image of the one or more fiducials rendered by the display device, determining a position or an angle of the one or more fiducials in the second captured camera image, and determining a second position on the display device that the second handheld device is aimed towards based at least on the determined position or angle of the one or more fiducials in the second camera image, where the application may be controlled based on the determined position and the determined second position. The application may be a video game application or a media center application. Controlling the application may further include changing a view of an avatar in a virtual universe based on determining that an orientation of the handheld device has changed.

The process may also include capturing, at the handheld device, a second camera image of the one or more fiducials rendered by the display device, determining a second position or a second angle of the one or more fiducials in the second captured camera image, determining a second position on the display device that the handheld device is aimed towards based at least on the determined second position or second angle of the one or more fiducials in the second camera image, and determining a motion of the handheld device based on comparing the position with the second position, where the application may be controlled based on the determined motion. The process may also include determining a distance, position, or orientation of the second handheld device, where the distance, position, or orientation of the handheld device may be determined with respect to the display device.

The process may also include determining an identity of a user of a handheld device based on comparing the determined distance, position, or orientation of the second handheld device relative to the determined distance, position, or orientation of the first handheld device. The process may also include determining a first distance, position, or orientation of the handheld device with respect to the display device, determining a second distance, position, or orientation of the second handheld device with respect to the display device, and determining an identity of a first user and an identity of a second user based on the determined first distance, position, or orientation of the handheld device relative to the determined second distance, position, or orientation of the second handheld device.

According to another general implementation, a system includes one or more computers, and a computer-readable medium coupled to the one or more computers having instructions stored thereon which, when executed by the one or more computers, cause the one or more computers to perform operations. The operations may include capturing, by a handheld device, a camera image of one or more fiducials rendered by a display device, determining a position or an angle of the one or more fiducials in the captured camera image, determining a position on the display device that the handheld device is aimed towards based at least on the determined position or angle of the one or more fiducials in the camera image, and controlling an application based on the determined position on the display device.

According to another general implementation, a computer storage medium is encoded with a computer program, the program including instructions that when executed by data processing apparatus cause the data processing apparatus to perform operations. The operations may include capturing, by a handheld device, a camera image of one or more fiducials rendered by a display device, determining a position or an angle of the one or more fiducials in the captured camera image, determining a position on the display device that the handheld device is aimed towards based at least on the determined position or angle of the one or more fiducials in the camera image, and controlling an application based on the determined position on the display device.

This brief summary has been provided to enable a quick understanding of various concepts and implementations described by this document. A more complete understanding can be obtained by reference to the following detailed description in connection with the attached drawings. It is to be understood that other implementations may be utilized and changes may be made.

DETAILED DESCRIPTION

Figure 1:
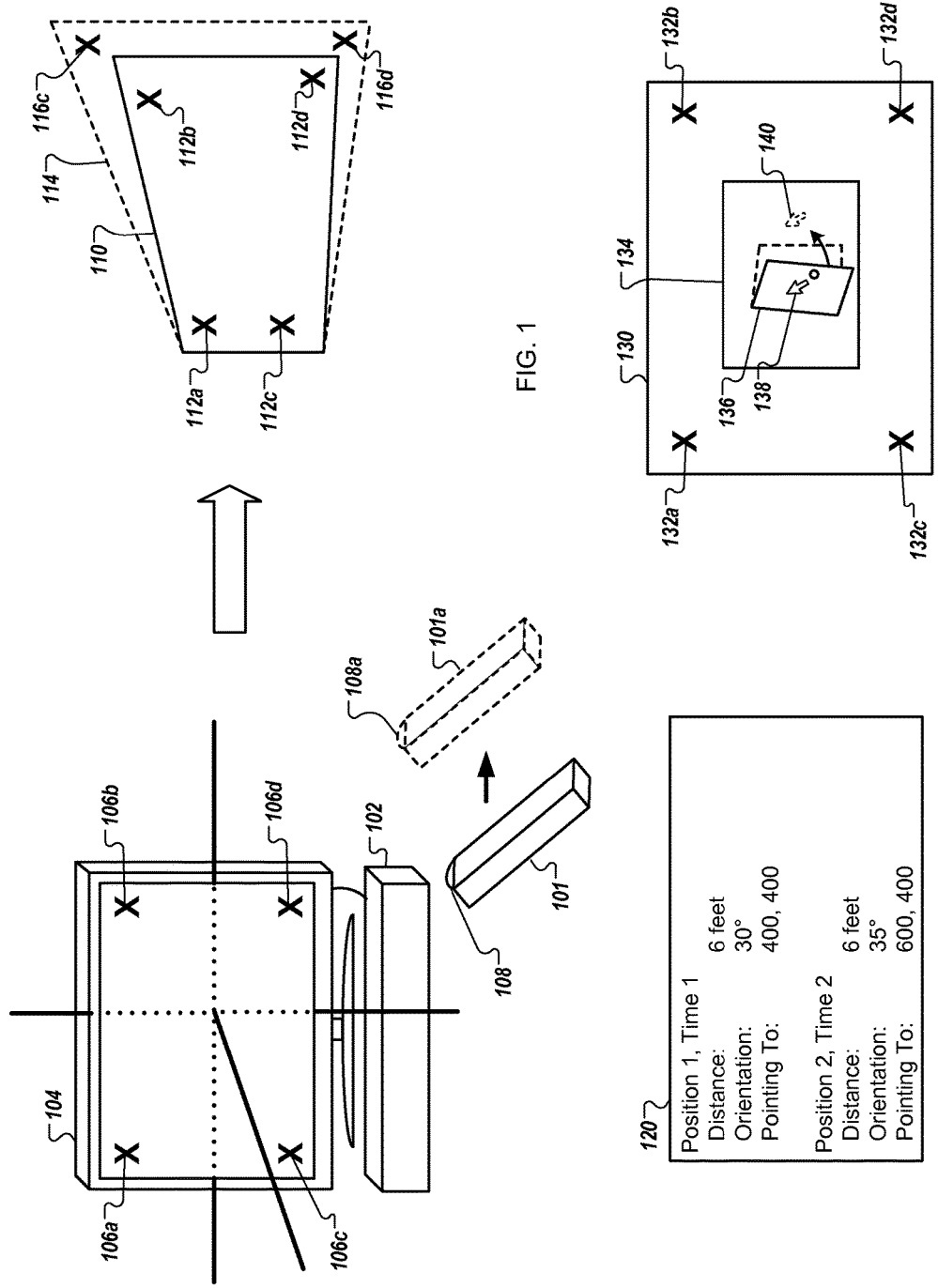
FIG. 1 is a contextual diagram demonstrating.

FIG. 1 is a conceptual diagram demonstrating application control through the use of a handheld device 101. The handheld device 101 may be, for example, a remote control or a game controller. The handheld device 101 may be in communication with a display device 102. The display device 102 may be, for example, a desktop computer, laptop computer, video game console, set top box, etc. The display device 102 includes a user interface 104. The user interface 104 may be, for example, a computer monitor or television display.

The user interface 104 renders fiducials 106a-d. A fiducial is a visual feature of an image that is unique in shape or color. For example, existing user interface components displayed onto the user interface 104 may be used as fiducials. Other examples of fiducials include a desktop icon, company logo, or one or more corners of the user interface 104.

The handheld device 101 includes a camera 108. The camera 108 captures a camera image of the fiducials 106a-d. Multiple camera images may be captured. For example, if the user moves the handheld device 101 to the right, as illustrated by a handheld device 101a, the camera 108a may capture a camera image of the fiducials 106a-d at a second point in time.

A position or an angle of each of the fiducials 106a-d may be determined in each captured camera image. For example, a camera image 110, captured by the handheld device 101, includes captured fiducial images 112a-d. Due to the perspective created by the angle of the handheld device 101 when the camera image 110 was captured, the fiducial images 112a-d do not appear in an exact rectangular alignment as do the corresponding fiducials 106a-d displayed in the user interface 104. For example, the fiducial 106b is vertically aligned above the fiducial 106d, while the fiducial image 112d appears to the right of the fiducial image 112b. As another example, the fiducial 106b is horizontally aligned with the fiducial 106a, while the fiducial image 112b appears above the fiducial image 112a.

Furthermore, perspective-related distortion may change as the orientation of the handheld device 101 changes. For example, a camera image 114, captured by the handheld device 101a (e.g., after the user moved the handheld device 101 to the right) is overlaid (e.g., for comparison) on top of the camera image 110. The greater angle of the handheld device 101b causes a greater "stretch" to the right side of the camera image 114 as compared to the camera image 110. For example, the fiducial image 116d is lower and farther to the right than the corresponding fiducial image 112d and the fiducial image 116c is higher and farther to the right than the corresponding fiducial image 112b.

The camera images 110 and 114 may be compared, and computations may be performed (e.g., triangulation), based on the determined fiducial position information, to determine a position on the user interface 104 that the handheld device 101a is aimed towards. Also, in some implementations, the position and distance, or orientation, of the handheld device 101a relative to the user interface 104 may be determined. For example, table 120 displays example calculated information, indicating that at a first time point, the display device 101 was determined to be six feet from the user interface 104, oriented at thirty degrees, and pointing to a coordinate location of (400,400) on the user interface 104, and that at a second time point, the display device 101a was determined to be six feet from the user interface 104, oriented at thirty five degrees, and pointing to a coordinate location of (600,400) on the user interface 104.

An application may be controlled in response to determining a position on the user interface 104. For example, a user interface 130 is rendering fiducials 132a-d and an area 134 presenting a virtual universe. The area 134 displays a virtual door 136 (e.g., as part of a virtual game). A cursor 138 is displayed at a previously determined position. In response to the user moving the handheld device 101 to the right (as indicated by handheld device 101a), a new position on the user interface 130 may be determined. A cursor 140 may be displayed at the new position (e.g., and the cursor 138 may be removed from the user interface 130, such as to simulate cursor movement). In response to detected change in position, an action may be performed in the virtual world, such as the shutting of the door 136 in the virtual universe.

In the example shown in FIG. 1, the user interface may be controlled to render the fiducials at specific locations (e.g., a specific pattern of multiple fiducials) within the user interface and each with a specific shape and color. Rendering the fiducials at specific locations within the user interface and with the specific shape and color, allows the fiducials to be readily detected and analyzed to determine position and/or angle of the handheld device relative to the user interface. The user interface may be controlled to integrate or overlay the fiducials with other display elements in an unobtrusive manner. The handheld device or the display device may cause the rendering of the fiducials, perhaps as additional elements to output provided by an application (e.g., a video game). The handheld device or the display device also may select appropriate fiducials already being rendered on the display device as output provided by an application (e.g., a video game). Because the fiducials are rendered on the user interface of the display device, a position and/or angle of the handheld device relative to the user interface may be detected without having to add additional hardware components to supplement the display device and generate reference points.

Figure 2:
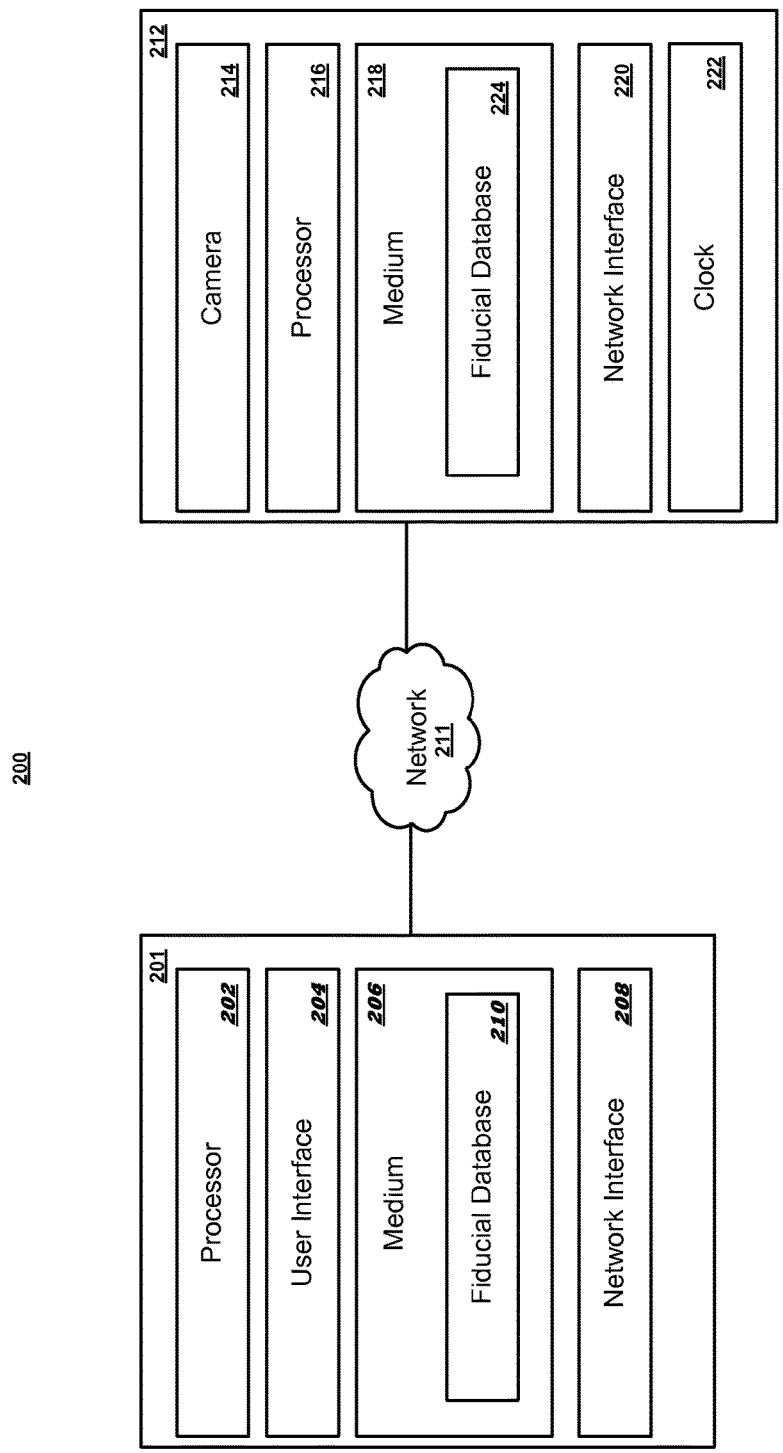
FIG. 2 illustrates an application control system.

FIG. 2 illustrates an application control system 200. The system 200 includes a display device 201 connected to one or more handheld devices 212 over a network 211. The display device 201 includes a processor 202, a user interface 204, a medium 206, and a network interface 208. The handheld device 212 includes a camera 214, a processor 216, a medium 218, a network interface 220, and a clock 222.

The display device 201 may be a desktop computer, laptop computer, video game console, set top box, digital picture frame, or any other device capable of displaying an image. The handheld device 212 may be a remote control, game controller, laser pointer, mobile phone, PDA (Personal Digital Assistant), or other mobile device. In an alternate implementation, the handheld device 212 may be held in a static position, and the display device 201 may be a handheld display device which is moved around the handheld device 212.

The mediums 202 and 218 store and record information or data, and each may be an optical storage medium, magnetic storage medium, flash memory, or any other storage medium type. The medium 206 includes a fiducial database 210 and the medium 218 includes a fiducial database 224. The fiducial databases 210 and 224 store, for example, shape data, timing data (e.g., for flashing fiducials), and locations of fiducials on the user interface 204. In some implementations, both the fiducial database 210 and 224 are used. In other implementations, one of the fiducial databases 210 and 224 is used. The clock 222 may be used, for example, to coordinate the timing of displaying flashing fiducials.

The user interface 204 may be configured to render a visual display image. For example, the user interface 204 may be a monitor, a television, a liquid crystal display (LCD), a plasma display device, a projector with a projector screen, an auto-stereoscopic display, a cathode ray tube (CRT) display, a digital light processing (DLP) display, or any other type of display device configured to render a display image. The user interface 204 may include one or more display devices. In some configurations, the user interface 204 may be configured to display images associated with an application, such as display images generated by an application, including a control and an object such as an avatar.

The display device 201 may be connected to the network 211 and possibly to one or more other networks over the network interface 208. Similarly, the handheld device 212 may be connected to the network 211 and possibly to one or more other networks over the network interface 220. The network 211 may include, for example, one or more of the Internet, Wide Area Networks (WANs), Local Area Networks (LANs), analog or digital wired and wireless telephone networks (e.g., a PSTN, Integrated Services Digital Network (ISDN), and Digital Subscriber Line (xDSL)), radio, television, cable, satellite, and/or any other delivery or tunneling mechanism for carrying data services. Networks may include multiple networks or subnetworks, each of which may include, for example, a wired or wireless data pathway. In another implementation, the network 211 is omitted, and the display device 201 is connected to the handheld device over a direct, wireless or wireline communication channel, for example using Bluetooth, Wi-Fi, a modulated near-infrared signal, or a modulated short-range radio frequency communication.

The camera 214 captures or otherwise produces camera images which may be transmitted to the processor 216 and which may be transmitted to the display device 201. The processors 202 and 216 may process the camera images using techniques described throughout this disclosure. The camera 214 may capture images either as still photographs or a sequence of moving images. The camera 214 may use the light of the visible spectrum or with other portions of the electromagnetic spectrum. For example, the camera 214 may be a digital camera, a digital video camera, or any other type of device configured to capture images. The camera 214 may include one or more cameras. In some examples, the camera 214 may be configured to capture images of the user interface 204 within the field of view of the camera 214.

The camera 214 may be any sensor capable of detecting a signal generated by the display device. The camera 214 may be a grey-scale camera or a color camera. Alternatively, the camera 214 may be an infrared camera if the display device is capable of generating an infrared image.

The processor 216 may be capable of receiving images from the camera 214 and processing them to produce position data. The processor 202 may be capable of receiving images from the handheld device 212 and processing them to produce position data. The processor 202 may also generate display images that are displayed on the user interface 204.

Although the display device 201 has been described as including or interfacing with a personal computer (PC) or set top box, such a description is made merely for the sake of brevity, and other implementations or manifestations are also contemplated. For instance, the display device 201 may be implemented using a television, an ultra-mobile personal computer (UMPC), a mobile internet device (MID), a digital picture frame (DPF), a portable media player (PMP), a general-purpose computer (e.g., a desktop computer, a workstation, or a laptop computer), a server, a gaming device or console, or any other type of electronic device that includes a processor or other control circuitry configured to execute instructions, or any other apparatus that includes a user interface.

Figure 3:
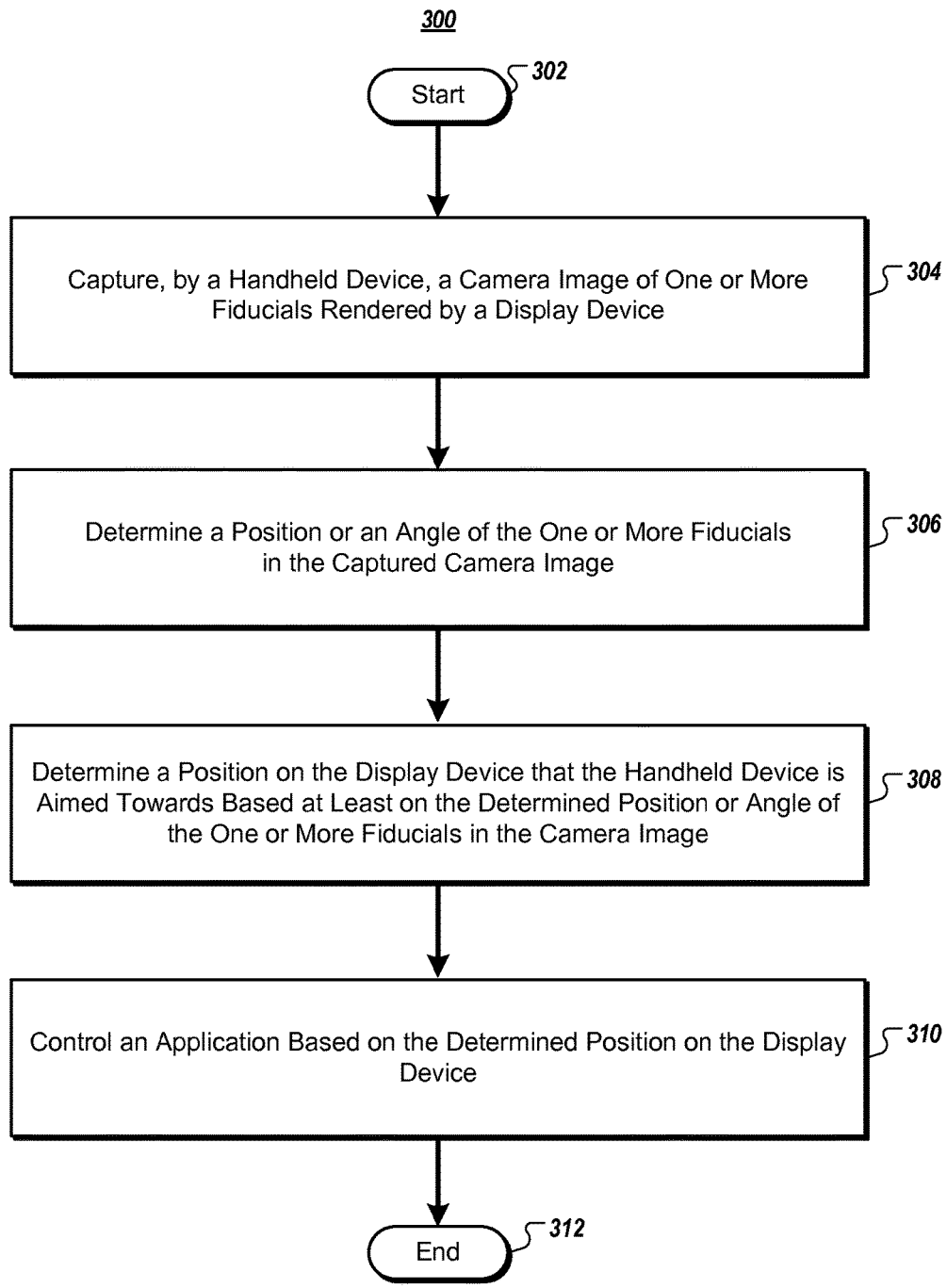
FIG. 3 is a flowchart of an exemplary process.

FIG. 3 is a flowchart illustrating a computer-implemented process 300 for controlling an application. Briefly, the process 300 includes: capturing, by a handheld device, a camera image of one or more fiducials rendered by a display device; determining a position or an angle of the one or more fiducials in the captured camera image; determining a position on the display device that the handheld device is aimed towards based at least on the determined position or angle of the one or more fiducials in the camera image; and controlling an application based on the determined position on the display device.

In further detail, when the process 300 begins (S302), a camera image of one or more fiducials rendered by a display device is captured by a handheld device (S304). A fiducial is a visual feature of an image that is unique in shape or color. Example fiducials that may be included in the captured camera image include user interface components, desktop icons, company logos, screen corners, and video game reference parts (e.g., a video game health indicator, a video game weapon part, a video game logo, a video game interface control, etc.).

A position or an angle of the one or more fiducials in the captured camera image is determined (S306). For example, information identifying a shape or position of the one or more fiducials may be accessed from a memory of the handheld device.

A position on the display device that the handheld device is aimed towards is determined based at least on the determined position or angle of the one or more fiducials in the camera image (S308).

An application is controlled based on the determined position on the display device (S310), thereby ending the process 300 (S312). For example, a video game application or media center application may be controlled. As a more specific example, an identity of a user of the handheld device may be determined based on the determined position on the display device that the handheld device is aimed towards.

Figure 4:
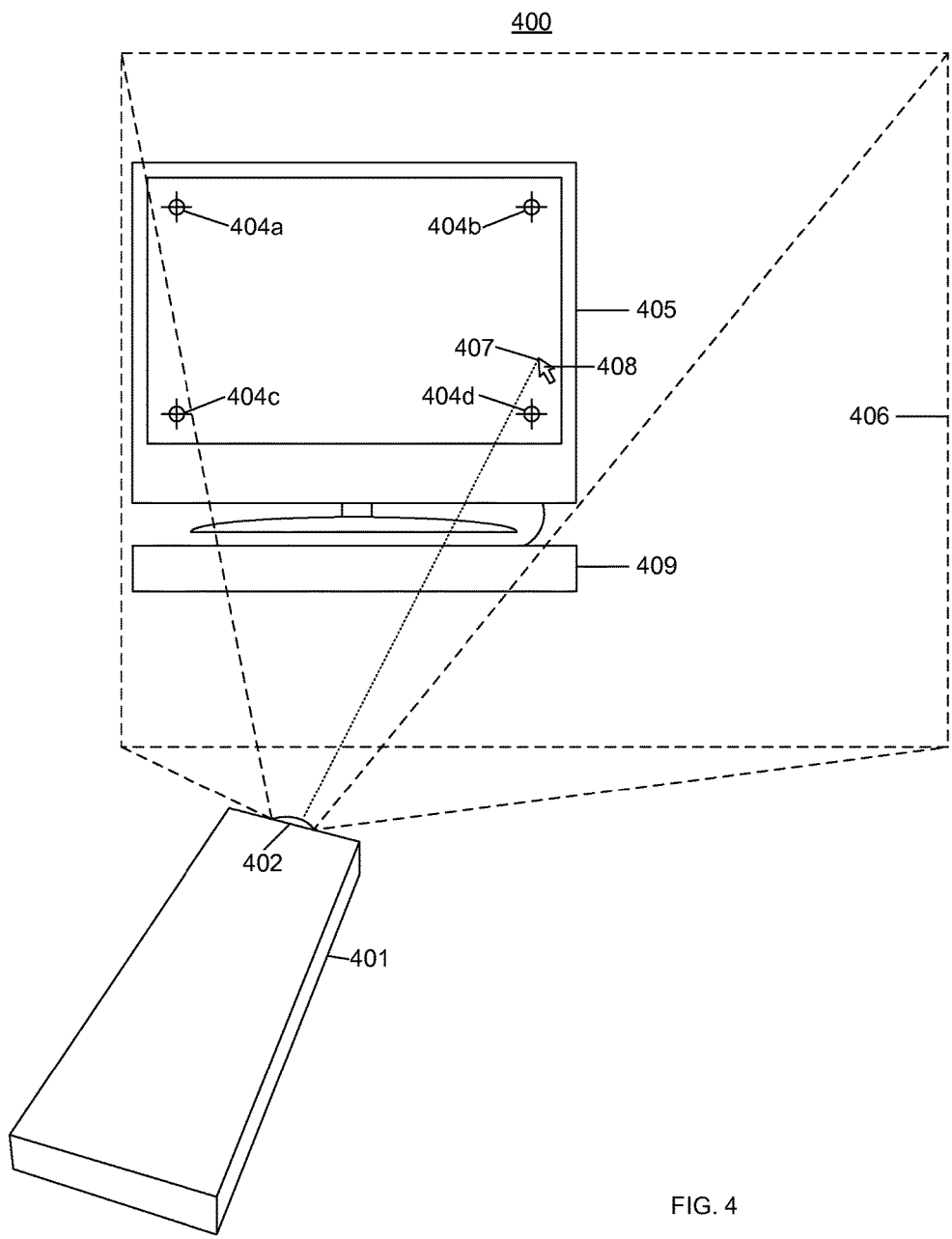
FIG. 4 illustrates fiducial image capture using a handheld device.

FIG. 4 illustrates an application-control system 400. A handheld device 401 includes a camera 402 and processor (not shown). The camera 402 detects a set of fiducials 404a-d that are rendered onto the display image of display 405. The field of view 406 of the camera 402 may be such that the set of fiducials 404 are within the field of view 406 when the handheld device 401 is pointing to any position (e.g., position 407) of the display 405. A cursor 408 may be rendered onto the display image at the position pointed to by the handheld device 401 (e.g., position 407).

The handheld device 401 may include buttons that can be pressed. The handheld device 401 may have a size and appearance similar to a television remote control. The handheld device 401 may further include a transmitter, such as a wireless Bluetooth transmitter. The transmitter may transmit position data (e.g. coordinates) and button data to a display device 409. The display device 409 may transmit instructions (e.g. starting or stopping tracking, describing the type of fiducial) to the handheld device 401.

The display device 409 may be a desktop computer, laptop computer, video game console, set top box, etc. The display device 409 may generate display images that are displayed on the display 405. Generating display images may include overlaying fiducials onto a video image, or rendering a graphical user interface that includes fiducials. In an alternative variation of the system 400, camera images are transmitted to the display device 409 and may be processed by a processor within the display device 409. However, in this implementation, images may require more bandwidth than position data for transmission.

In another alternative variation of the system 400, the rendering of the display image may be performed within the handheld device 401 (effectively, in this implementation, a video game console is integrated into the handheld device 401). For example, the handheld device 401 may be a toy gun that executes a light-gun game, and may include a video output that is wired to a television.

Tracking with the camera 402 mounted onto the handheld device 401 may be an order of magnitude more precise than tracking with the camera 402 mounted to the display 405. Therefore, mounting the camera 402 on the handheld device 401 may be superior to mounting the camera 402 on the display 405.

When the camera 402 is mounted onto the handheld device 401, the displacement of the fiducials as the cursor is swept from one side of the display 405 to the other may be between one half and one fourth of the camera image, depending on the distance, screen size, and camera's field of view. Assuming a 1024×768 resolution sensor, between two hundred fifty and five hundred discrete horizontal cursor positions may be discerned. The use of sub-pixel interpolation may increase the effective resolution and allow the cursor position to be calculated at or near the display screen's native resolution.

When the camera 402 is mounted on the display 405 and markers are tracked on the handheld device 401, a very small displacement of the markers may be amplified into a large displacement of the on-screen cursor. Even with sub-pixel interpolation, the cursor position may have significant jitter.

As discussed in more detail below, aspects of detecting and/or displaying fiducials may vary based on the type of the display device being used. In this regard, the system may determine a type of the display device being used from among multiple, different types of display devices (e.g., from among at least an LCD, plasma, DLP or CRT display). The system may select, from among multiple, different filtering techniques, a filtering technique that is suitable for the determined type of the display device and may apply the selected filtering technique to captured camera images in performing fiducial detection. The filtering technique may refer to frame rate and/or color filtering needed to appropriately detect fiducials in images displayed by the determined type of display device. Different filtering techniques may be applied for each of the different types of display devices or, in some cases, the same filtering technique may be applied to different display devices.

Liquid crystal (e.g., LCD) and plasma displays produce relatively stable images when captured by a camera. Tracking may occur at the same frame rate as the display device (usually sixty frames per second). It may be possible to track at a faster frame rate (e.g. two hundred forty frames per second), but occasional frames may be discarded. For example, if the camera is operating at two hundred forty frames per second, three consecutive camera frames may capture a complete display image, followed by one camera frame that captures an incomplete display image if that frame's exposure time coincides with the display device's refresh, or a torn image if that frame's exposure time captures part of two different display frames. The incomplete or torn camera frame may be detected (e.g., determined by the processor based on the brightness or completeness of the display image as it appears within the camera image) and discarded. Support of faster frame rates may affect the choice of hardware and influence the cost of the handheld device 401.

Most DLP (Digital Light Processing) devices sequentially display red, green, and then blue, which may produce flashing patterns when captured by the camera 402. Depending on various factors, tracking may be performed at the same frame rate as the display 405, usually sixty frames per second. Because of the way in which a DLP device cycles colors, the camera 402 may capture a complete blue and green image but only a partial red image. Another camera frame may capture a complete blue and red image but only a partial green image. The software may filter the camera image to select one or more color channels that are most complete (e.g. brightest) and discard color channels that are only partially captured (e.g. darker, incomplete image). The filtered image may be processed normally if the fiducials are black and white, or may be processed at a higher frame rate (e.g. exactly three times the display frame rate, where each consecutive camera frame detects one color of the display image).

In some cases, tracking a DLP device may be limited to a slower frame rate (e.g., thirty frames per second) if the fiducials involve color. Exposing the camera 402 over a period of time that captures more than one complete cycle of the DLP's color wheel may ensure that all color channels (red, green, and blue) are complete.

A CRT (Cathode Ray Tube) display may produce a dark band when captured by the camera 402. A CRT display be tracked at the same frame rate as the display (typically sixty frames per second) if the handheld device 401 can be synchronized to the display. If the handheld device 401 is not able to be synchronized to the display then tracking may be limited to a slower frame rate (e.g. thirty frames per second) so that the dark band does not obscure any part of the fiducials.

In order to track DLP and CRT displays, the handheld device 401 may perform the additional processing described above. The display type may be auto-detected by analyzing the change in brightness and coherency of the display image as it appears within consecutive camera images. The handheld device 401 may or may not be manually calibrated and the type and position of the fiducials may be stored in memory of the handheld device 401 or transmitted to the handheld device 401. Multiple handheld devices 401 may share the same fiducials rendered onto the display 405. Therefore, if multiple users each have a handheld device 401, a position for each handheld device 401 may be simultaneously calculated or determined.

A process on the display device 409 may analyze the display image to select a set of fiducials, and transmit a description of the fiducial shapes and positions to the handheld device 401. Using this process, many display images may be tracked without modifying the appearance of the application, as long as the display image contains some strong features such as corners and edges.

Analyzing the display image may include identifying features, such as corners and edges by analyzing the pixel data in the display image buffer. The display image may contain, for example, a video, photograph, video game, or computer desktop application. Selecting a set of fiducials may include selecting the strongest features (e.g. having highest contrast).

As another example, features may be identified by analyzing higher level data describing desktop components (e.g. windows, title bars, menus, toolbars, etc.). A set of features or shape description may be predetermined for each type of high level desktop component (e.g. it may be assumed that a window has four corner features). Selecting a set of fiducials may include selecting desktop components that are visible (e.g. not occluded by other desktop components) and are likely to include the strongest features (e.g. highest contrast).

The description of the fiducials transmitted to the handheld device 401 may be compact, which may reduce bandwidth requirements, and may be updated as the appearance of the display image changes. As another example, the display image can be transmitted to the handheld device 401, and the steps of analyzing and selecting may be performed on the handheld device 401 (although in this example the bandwidth required to transmit the images may be high). The description of the fiducials or the camera image may be buffered to account for latency in the rendering, display, and capturing of images, or the latency of transmitting the fiducial descriptions.

Figure 5:
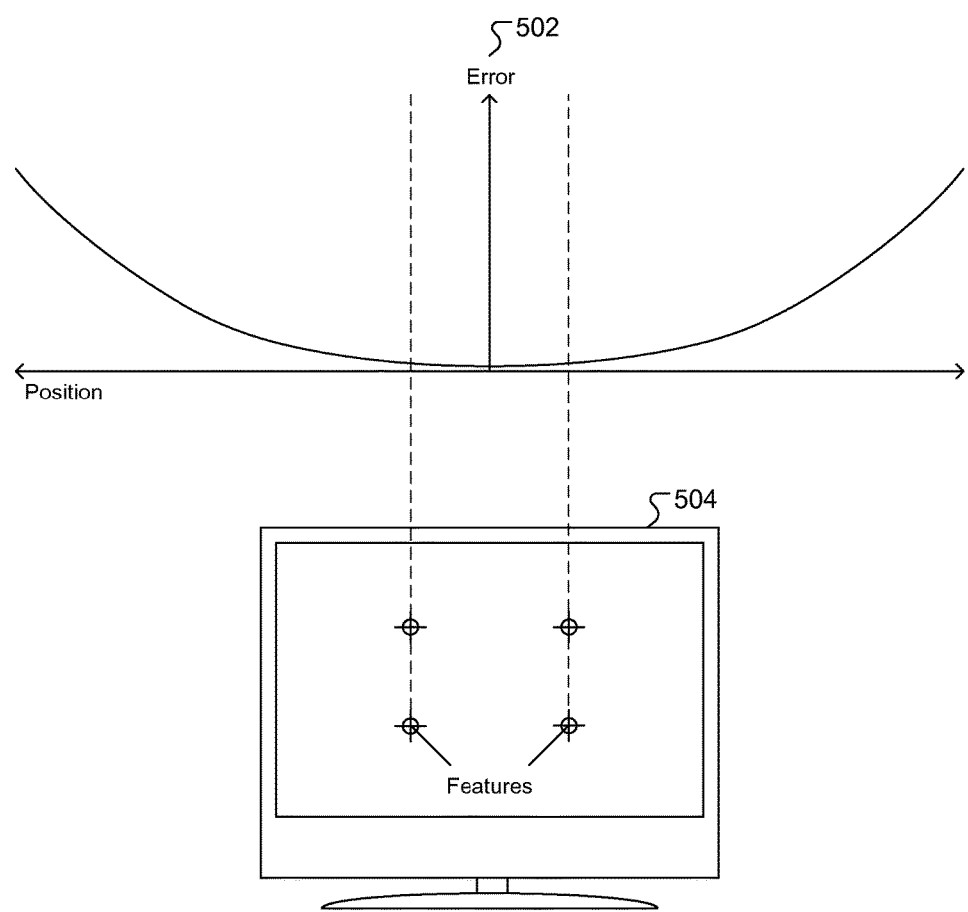
FIG. 5 illustrates the expected accuracy of a cursor position relative to a pair of fiducial positions.

Fiducials do not need to be at the edges of a rendered display image. For example, FIG. 5 illustrates the expected accuracy of a cursor position relative to a pair of fiducial positions. Conceptually, an error 502 represents the offset of a cursor compared to the position of a laser dot, such as if a laser pointer was mounted to a handheld device. As the device is pointed further outside the bounds of the fiducials, the cursor and laser may gradually diverge. However, without the aid of a laser pointer, a user is unlikely to perceive this error even if the separation of the fiducials is only one third the dimensions of the display screen, as illustrated in the display 504 in FIG. 5.

A minimum of two fiducials may be used. If a single fiducial is used, a position may be estimated, but the actual position may diverge from the expected position the further the handheld device points away from the fiducial. The actual and estimated positions may re-converge when the handheld device moves towards the fiducial.

Figure 6:
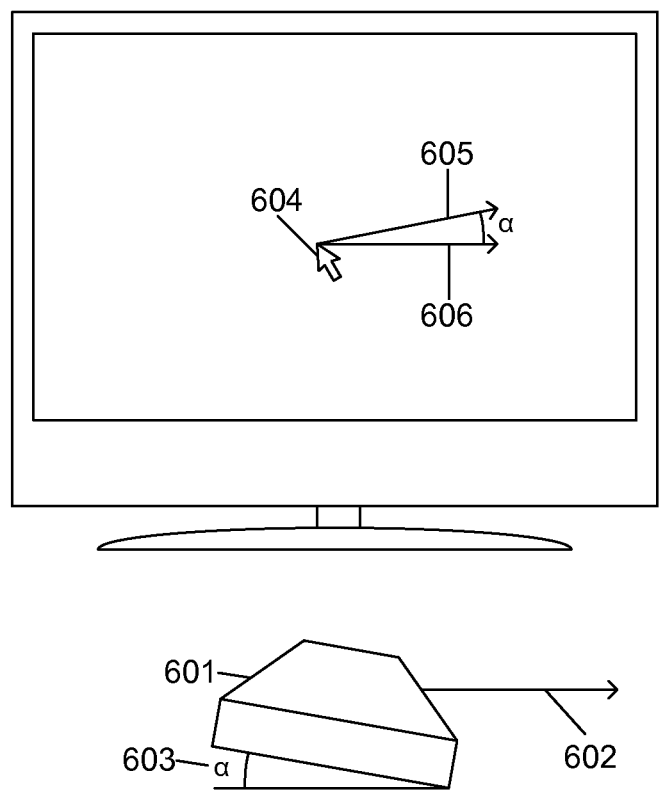
FIGS. 6 and 7A-D illustrate cursor movement based on one fiducial.

If one fiducial is used, movements may be inaccurate if the user holds the handheld device such that it is not level. As illustrated in FIG. 6, if a user moves a handheld device 601 towards the right in a direction 602 while holding the device 601 at an angle 603, a cursor 604 may travel along path 605, which diverges from an expected path 606 by an angle similar to the angle 603.

Figure 7A:
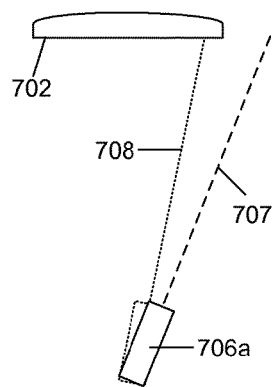

If one fiducial is used, movements may be improperly scaled because the distance of the user relative to the size of the display may not be able to be determined. Examples are illustrated in FIGS. 7A-7D. At a certain distance from the screen, a user may have to move a handheld device an angle distance to sweep a cursor across a display screen, where the orientation is independent of the screen size. For example, when a display screen 702 is small, as shown in FIG. 7A, the user may have to move a handheld device 706a to an orientation 707 that is further than an expected orientation 708, thereby providing a sensation that the device 706a is insufficiently sensitive to motion.

Figure 7B:
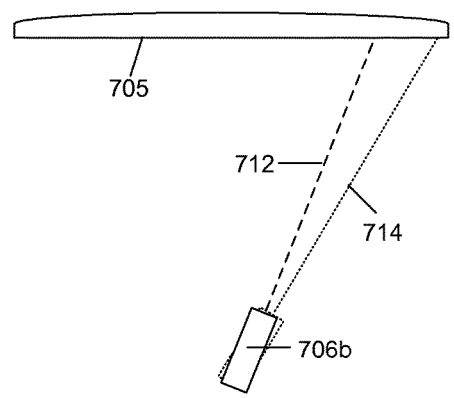

As another example, when a display screen 710 is large, as shown in FIG. 7B, the user may have to move a handheld device 706b to an orientation 712 that is less than an expected orientation 714, thereby providing a sensation that the device 706b is overly sensitive to motion.

Figure 7C:
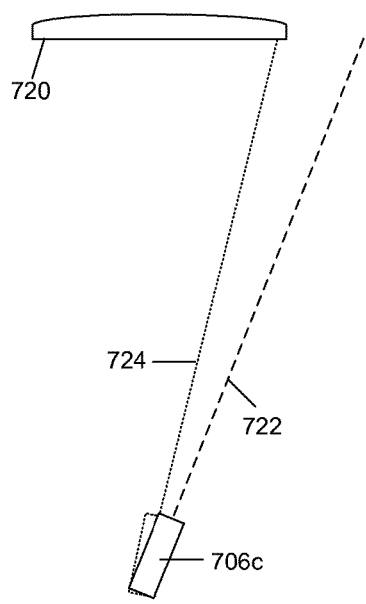
Figure 7D:
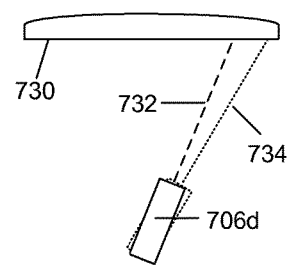

With a consistent size display, a user may have to move a certain angle distance to sweep a cursor across a display, where the angle is independent of the distance from the screen. For example, when the user is far from a display screen 720, as shown in FIG. 7C, the user may have to move a handheld device 706c to an orientation 722 that is further than an expected orientation 724, thereby providing a sensation that the device 706c is insufficiently sensitive to motion. As another example, when the user is near to a display screen 730, as shown in FIG. 7D, the user may have to move a handheld device 706d to an orientation 732 that is less than an expected orientation 734, thereby providing a sensation that the device 706*d* is overly sensitive to motion.

The position of a detected fiducial in the camera image may be corrected to account for lens distortion. In some situations, correction may not be performed, such as if it is determined that the lens distortion is not detectable by a user. If correction is performed, the corrected position of the detected fiducial in the camera image may be compared to a reference position. For example, a reference position may be the position where the fiducial is expected to appear in the camera image if the handheld device is aimed at the center of the display screen. The difference between the detected position and the reference position may be multiplied by a scale factor to remap the detected position into the coordinate space of the computer/game-console. The scaled position may be relative to the position of the fiducial within the display image, and in this case the scaled position may be subtracted from the fiducial display position to generate a position relative to the display image. A cursor may be rendered into the display image at the position relative to the display image.

A scale factor may be predefined to account for an average size display screen and an average user distance from the screen. The user may be given the option of adjusting the scale factor if the user's display screen size or distance is significantly different than the predefined setting.

The use of two fiducials may be sufficient to calculate both the angle in which the handheld device is held and the distance of the user relative to the size of the display screen. Using two fiducials may eliminate the problems discussed above with respect to FIG. 6 and FIGS. 7A-D.

Figure 8:
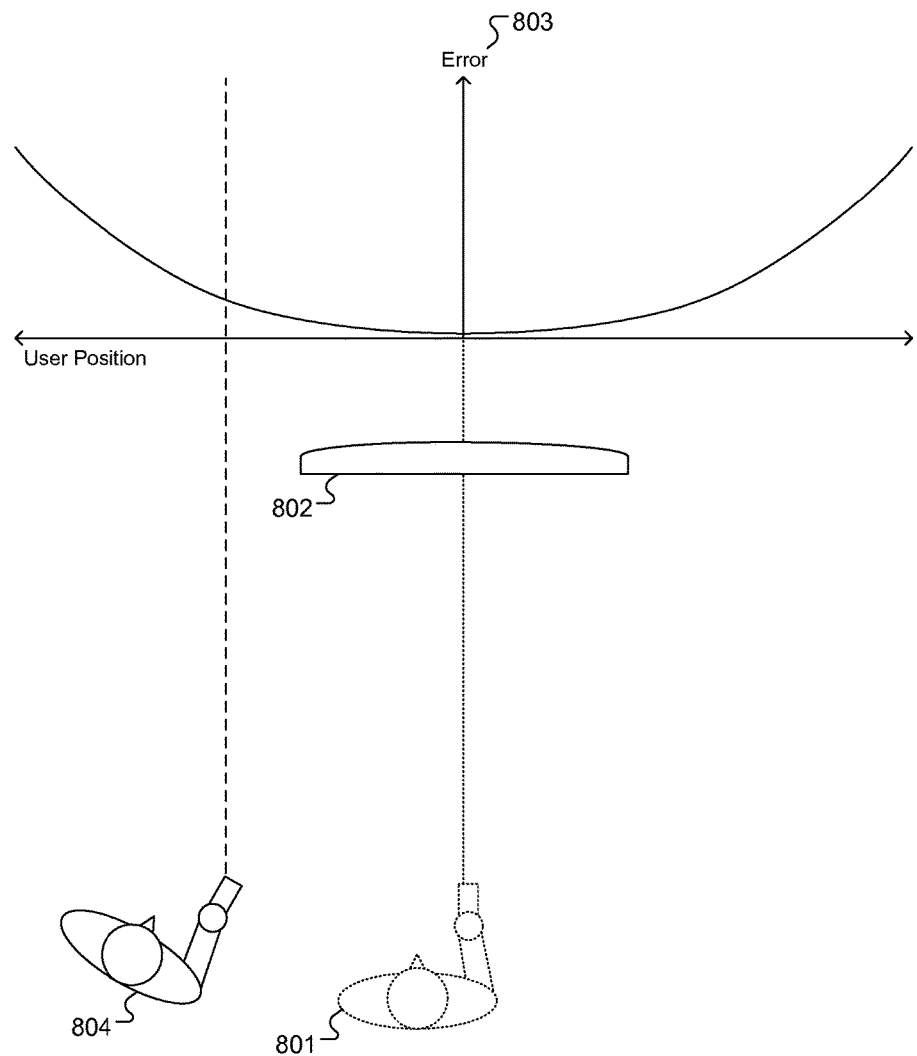
FIG. 8 illustrates accuracy of a cursor position.

FIG. 8 illustrates accuracy of a cursor position relative to the position of a user 801 (e.g., such as if the user 801 is seated directly in front of, or off to the side of a display screen 802). Conceptually, an error 803 represents the offset of the cursor compared to the position of a laser dot, such as if a laser pointer was mounted to a handheld device. The cursor position may be highly accurate for a user seated directly in front of the screen 802, but the cursor and laser may gradually diverge the further a user is seated off center. A similar relationship follows for the user above or below the screen 802. However, without the aid of a laser pointer, a user may be unlikely to perceive this error if the user 801 is seated up to thirty degrees off center (e.g., as illustrated by user 804).

In the case of two fiducials, a scale factor may be calculated based on the distance between the first fiducial and the second fiducial. An angle may be calculated based on the relative x and y position of the second fiducial relative to the first fiducial. The calculated angle may be compared to an expected angle (e.g. zero degrees if the fiducials are side-by-side). The detected position of the second fiducial may be rotated about the detected position of the first fiducial by a calculated difference in angle. Subsequent processing may be similar to processing for a single fiducial. For example, the position of the detected first fiducial in the camera image may be compared to a reference position. The reference position may be, for example, the position where the first fiducial is expected to appear in the camera image if the handheld device is aimed at the center of the display screen. The difference between the detected first position and the reference position may be multiplied by a calculated scale factor to remap the detected first position into the coordinate space of the computer/game-console. The scaled position may be subtracted from the first fiducial display position to generate a position relative to the display image. A cursor may be rendered into the display image at the position relative to the display image.

The use of four fiducials may significantly reduce the errors described above with respect to FIG. 5. Furthermore, a rough estimate of the position of the user relative to left, right, above, or below the screen may be calculated with four fiducials. Although accuracy may not be sufficient to track fine movements of the user, in a scenario where multiple users each have a handheld device, the order of the users (e.g. user A is seated to user B's left) may be determined.

Fiducials may vary in appearance. Furthermore, since some methods may be more suited to particular applications, the system may switch between types of fiducials by transmitting the type and positions of the fiducials to the handheld device.

Figure 9:
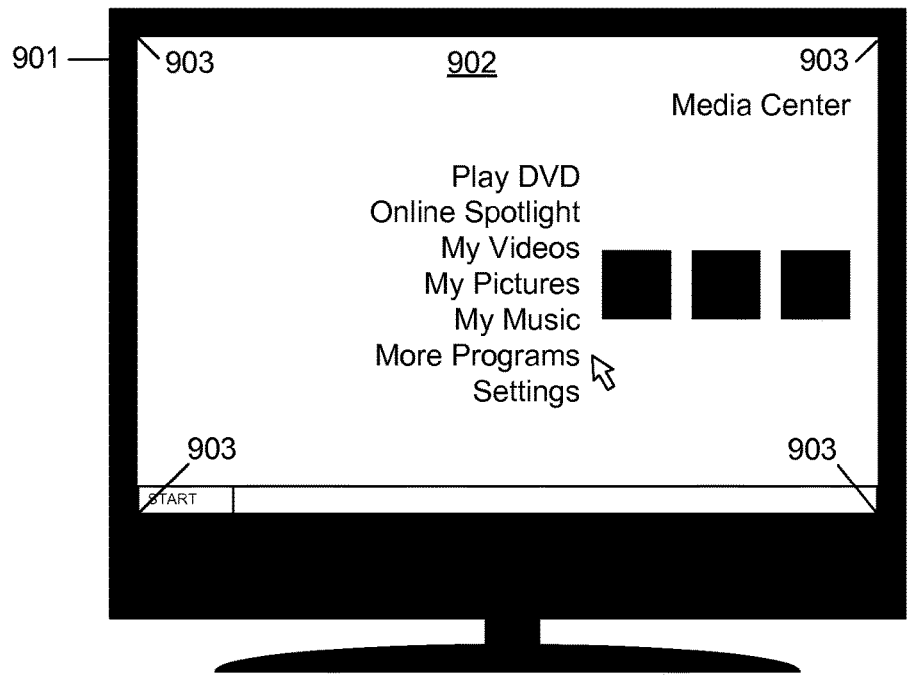
FIG. 9 illustrates screen-corner fiducials.

The corners or edges of the screen may be detected as four fiducials. An example of screen corners is illustrated in FIG. 9. Corners or edges of the screen may be detected, such as if the background color of a display screen 901 appears different than the bezel 902 surrounding the display screen 901, in either brightness or hue. Even if the bezel 902 is grey, the corners 903 of a blue background or menu bar may be detected based on hue.

The corners or edges of the screen may be used for any screen where the desktop color is controlled, (e.g., Windows Media Center). However, the screen corners or edges may not be able to be tracked during playback of full screen video, because the video may contain scenes that are too dark to provide a contrast between the screen and the bezel.

The corners of the display screen may be detected by using corner features. Additionally, the left, right, top and bottom edges of the display screen may be detected using a Hough transform algorithm.

Figure 10:
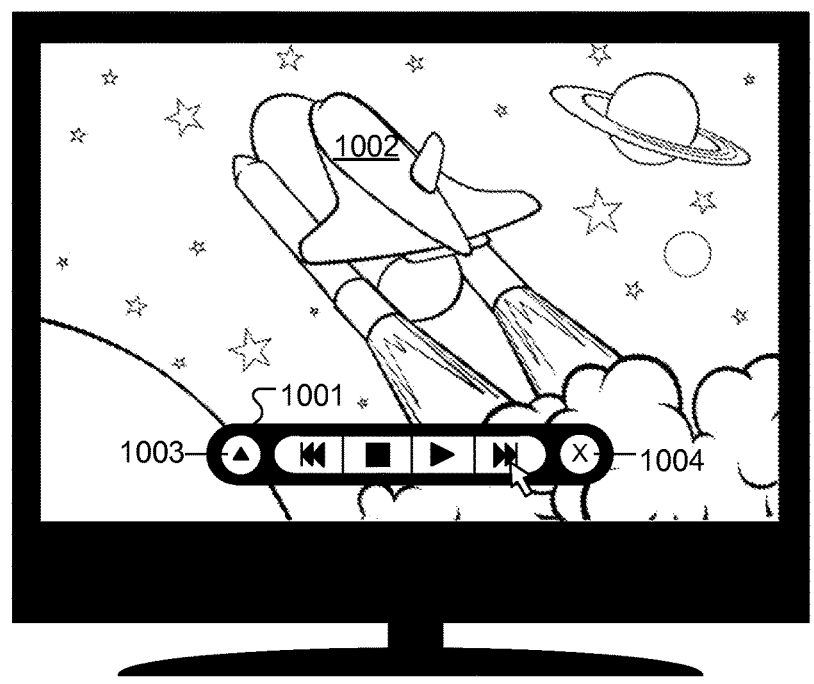
FIG. 10 illustrates the use of user interface control fiducials.

Regular target shapes, such as circles or rectangles, may be disguised as buttons or decorations within a graphical user interface, such as an example media control bar 1001 illustrated in FIG. 10 that is overlaid onto a full screen video image 1002. In this example, the fiducials 1003 and 1004 appear as circular buttons on either end of the bar 1001.

A thick border may be used for a fiducial. For example, the border may appear as two or more pixels thick in the camera image. However, the camera may be lower resolution than the display screen, and the display screen may be as small as one fourth the width of the camera's field of view. Therefore, the border may need to be up to twenty five pixels thick, depending on a number of factors. High contrast may be used. For example, the media bar may have a dark background that is opaque. In another example, the background may be slightly semi-transparent. Circles and rectangles may be used because they may be relatively easy to detect and may lead to accurate sub-pixel position calculation. The use of shapes may be avoided in other parts of the user interface. Unintentional occurrences of the target shapes may be detected and filtered out based on the relative arrangement of all potential detected target shapes. If other occurrences of shapes appear in other parts of the user interface, robustness may be reduced.

Circles and rectangles may be detected by using a Hough transform algorithm configured to detect circular or straight edges. Alternatively, circles and rectangles may be detected by performing threshold and clustering operations. A threshold operation may select a threshold value between a local minimum and maximum value and may classify pixels of a camera image as being higher or lower than the threshold value. If the shape, for example, is bright on a dark background, pixels classified as higher than the threshold value may be clustered. As another example, if the shape is dark on a bright background, pixels classified as darker than the threshold value may be clustered. Clustering may include forming sets of adjacent pixels.

Figure 11:
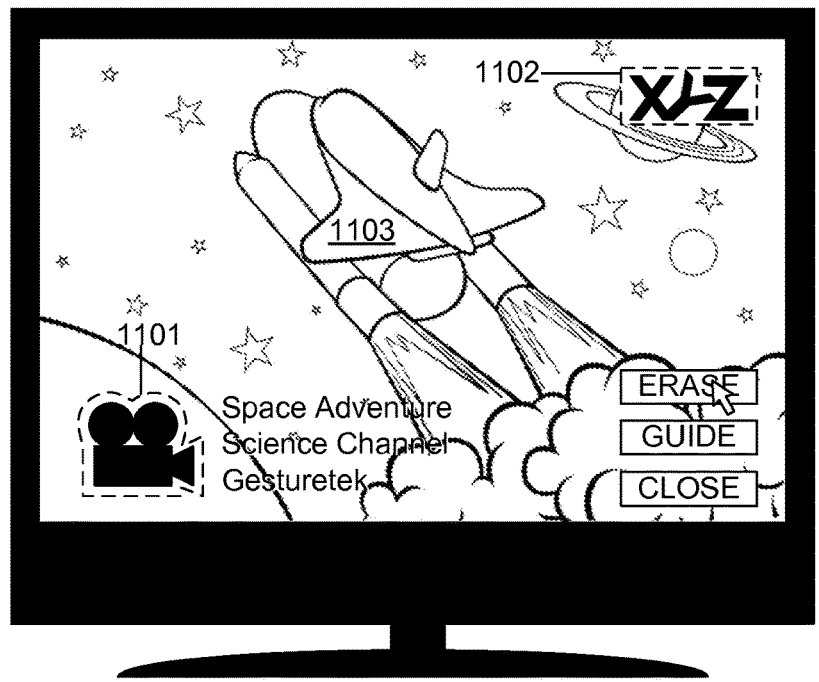
FIGS. 11 and 12 illustrate fiducials overlaid over a video image.
Figure 12:
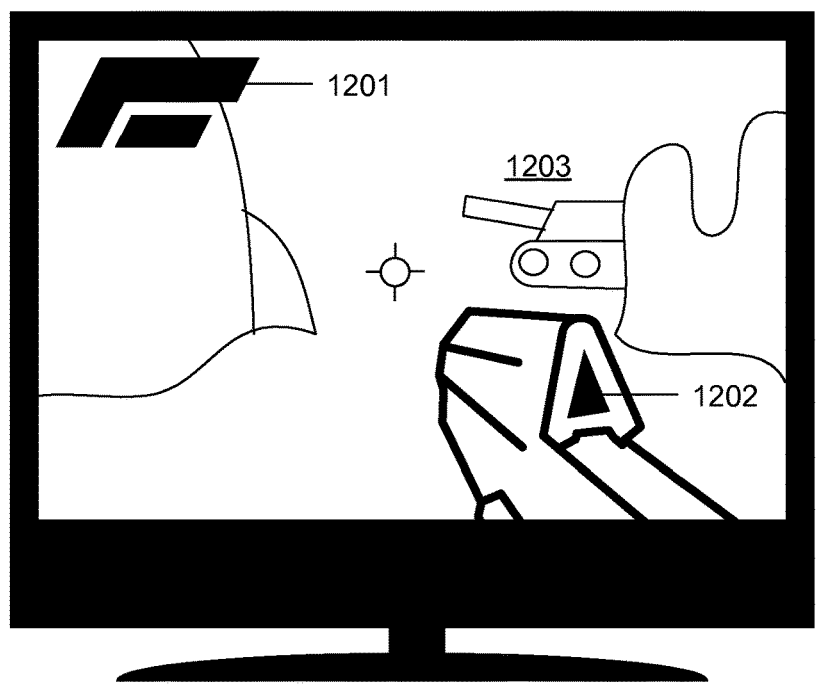

Logos and icons may be used as fiducials. For example, FIG. 11 illustrates two uniquely shaped fiducials 1101 and 1102 overlaid over a full screen video image 1103. Fiducial 1101 is a film camera icon and fiducial 1102 is a company logo. The fiducials 1101 and 1102 may or may not be aligned, and the tracking software may know their positions within the rendered screen image. A second example is illustrated in FIG. 12, which illustrates two uniquely shaped fiducials 1201 (a health indicator) and 1202 (a weapon part) overlaid over a video game image 1203.

The appearance of fiducials may include gradients and shading. Data describing the appearance of fiducials may be stored in the handheld device's memory, or transmitted to the handheld device. Furthermore, because the shapes may be complex, they may be less likely to appear within other parts of the display image.

Detecting complex target shapes may utilize a scale-invariant feature transform (SIFT) algorithm. The processing requirements to detect complex shapes is significantly greater than that required to detect regular target shapes, and may influence the choice of processor and cost of the handheld device.

In complex target shape detection algorithms other than the SIFT algorithm, complex shapes may fail to be detected if the handheld device is held at an angle (e.g., device 601, FIG. 6). The angle limit may be, for example, ten or fifteen degrees, but may be extended by performing additional processing to search for rotated versions of the shape. Complex shapes may also fail to be detected if the user is seated too far off center from the display screen (e.g., as shown in FIG. 8). The offset limit may be, for example, thirty degrees, but it may be extended by performing additional processing to search for perspective distorted versions of the shape.

Fiducials may be flashed on screen. The fiducial position may be tracked during the time in which the targets are displayed on the screen. Due to the way that some display devices process the image prior to display, targets may need to be flashed for multiple frames, which may increase their visibility. Due to these restrictions, flashing targets may not be suitable for continuously tracking a cursor, but may be used for a light-gun game, for example.

In some implementations, the system may control flashing of the fiducials on the display device based on a type of the display device. In these implementations, the system may determine a type of the display device from among multiple, different display device types (e.g., from among at least an LCD, plasma, DLP or CRT display). The system may select, from among multiple, different flashing techniques, a flashing technique that is suitable for the determined type of the display device and apply the selected flashing technique to the displayed fiducials. For instance, the system may control the display device to flash the fiducials at a particular rate that is suitable for the determined type of display device. Because the different types of display devices have different frame rates and different color display characteristics, the system may control flashing of the fiducials on the display device in different manners to enhance detection of the fiducials for the display device being used. The flashing technique selected may be communicated to the handheld device to alert the handheld device to the flashing pattern and, thereby, enhance fiducial detection.

A process on the stationary device may analyze the display image to select a set of fiducials, and transmit a description of the fiducial shapes and positions to the handheld device. Using this process, many display images can be tracked without modifying the appearance of the application, as long as the display image contains some strong features such as corners and edges.

Analyzing the display image may include identifying features, such as corners and edges by analyzing the pixel data in the display image buffer. The display image may contain a video, photograph, video game, or computer desktop application. Selecting a set of fiducials may include selecting the strongest features (e.g. having highest contrast).

Alternatively, features may be identified by analyzing higher level data describing desktop components (e.g. windows, title bars, menus, toolbars, etc.). A set of features or shape description is predetermined for each type of high level desktop component (e.g. it is assumed that a window has four corner features). Selecting a set of fiducials may include selecting desktop components that are visible (e.g. not occluded by other desktop components) and are known to strongest features (e.g. highest contrast).

The description of the fiducials transmitted to the handheld device is compact, minimizing the bandwidth requirements, and can be updated as the appearance of the display image changes. Alternatively, the display image can be transmitted to the handheld device, and the steps of analyzing and selecting are performed on the handheld device (although the bandwidth required to transmit the images is very high and therefore this is not preferred).

For all types of fiducials, the description of the fiducials may be buffered or the camera image may be buffered, to account for latency in the rendering, display, and capturing of images, or the latency of transmitting the fiducial descriptions.

Images from more than one handheld device may be captured. For example, after a first position on a display device has been determined based on a first handheld device, a second camera image of one or more fiducials rendered by the display device may be captured by a second handheld device and a position or an angle of one or more fiducials may be determined in the second captured camera image. A second position on the display device that the second handheld device is aimed towards may be determined based on the determined position or angle of the one or more fiducials in the second camera image, and an application may be controlled based on the first determined display device position and the second determined display device position.

An identity of a user may be determined based on the determined position on the display device that the handheld device is aimed towards. For example, a first user controlling a first handheld device may be assigned the identity "Player 2" if a second position on a display device is within a pre-defined region of the display device, such as the right half of a split-screen game.

A first distance, position, or orientation may be determined as the distance, position, or orientation of the first handheld device with respect to the display device. A second distance, position, or orientation may be determined as the distance, position, or orientation of the second handheld device with respect to the display device. A relative distance, position, or orientation may be calculated based on the second distance, position, or orientation relative to the first distance, position, or orientation. An identity of a user of a handheld device may be determined based on the first, second, or relative distance, position, or orientation. For example, a first user controlling a first handheld device may be assigned the identity "Player 2" and a second user controlling a second handheld device may be assigned the identity "Player 1" is the second position is to the left of the first position.

Figure 13:
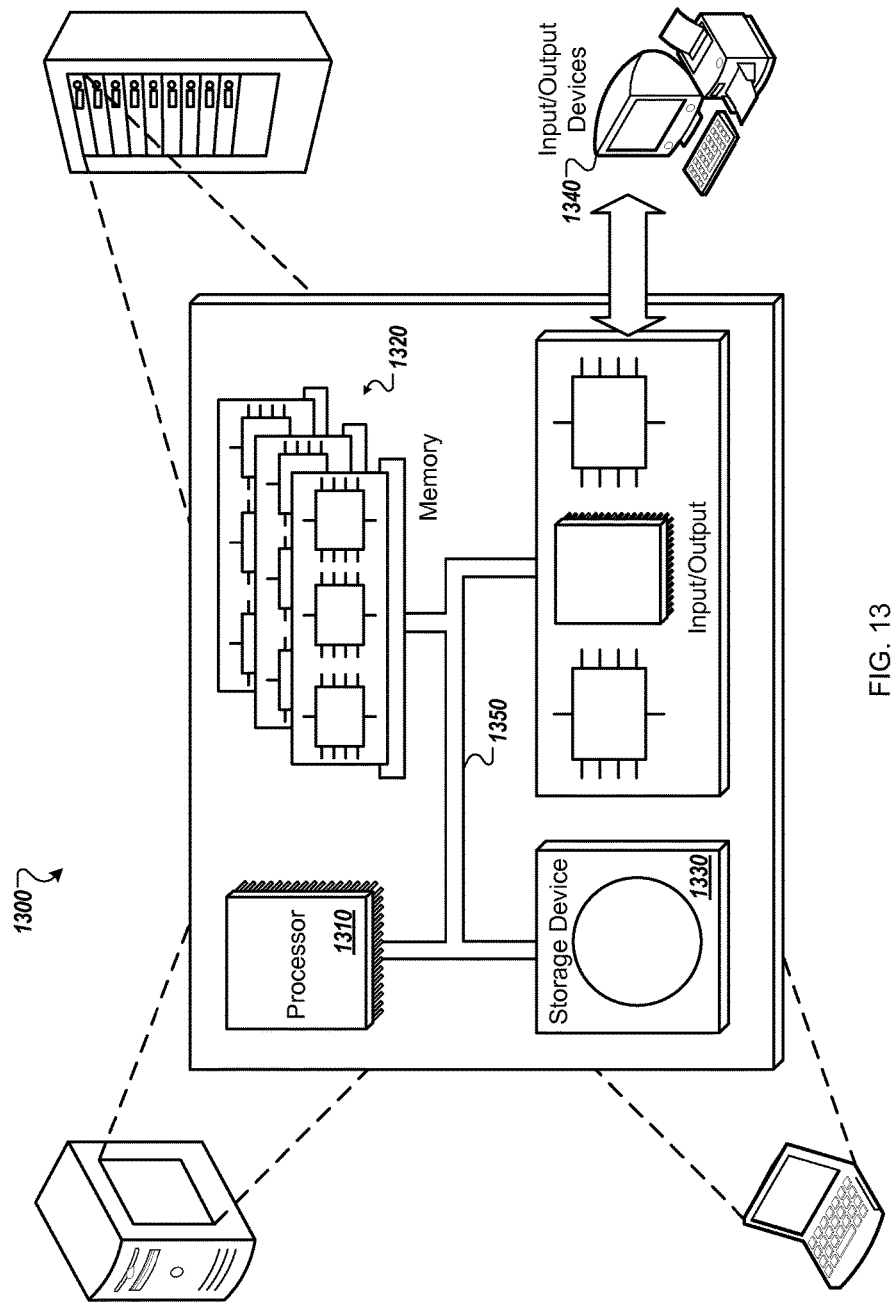
FIG. 13 illustrates an exemplary computing device.
Like reference numbers represent corresponding parts throughout.

FIG. 13 is a schematic diagram of an example of a generic computer system 1300. The system 1300 includes a processor 1310, a memory 1320, a storage device 1330, and an input/output device 1340. Each of the components 1310, 1320, 1330, and 1340 are interconnected using a system bus 1350. The processor 1310 is capable of processing instructions for execution within the system 1300. In one implementation, the processor 1310 is a single-threaded processor. In another implementation, the processor 1310 is a multi-threaded processor. The processor 1310 is capable of processing instructions stored in the memory 1320 or on the storage device 1330 to display graphical information for a user interface on the input/output device 1340.

The memory 1320 stores information within the system 1300. In one implementation, the memory 1320 is a computer-readable medium. In another implementation, the memory 1320 is a volatile memory unit. In yet another implementation, the memory 1320 is a non-volatile memory unit.

The storage device 1330 is capable of providing mass storage for the system 1300. In one implementation, the storage device 1330 is a computer-readable medium. In various different implementations, the storage device 1330 may be a floppy disk device, a hard disk device, an optical disk device, or a tape device.

The input/output device 1340 provides input/output operations for the system 1300. In one implementation, the input/output device 1340 includes a keyboard and/or pointing device. In another implementation, the input/output device 1340 includes a display unit for displaying graphical user interfaces.

The features described can be implemented in digital electronic circuitry, or in computer hardware, or in combinations of computer hardware and firmware or software. The apparatus can be implemented in a computer program product tangibly embodied in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

A number of implementations have been described. Nevertheless, it will be understood that various modifications may be made without departing from the spirit and scope of the disclosure. Accordingly, other implementations are within the scope of the following claims.

What is claimed is:

1. A computer-implemented method comprising:
   capturing, by a handheld device, a camera image of at least a portion of a display image comprising one or more fiducials, the display image being rendered by a display device;
   determining a position or an angle of the one or more fiducials in the captured camera image based at least in part on information about the rendered display image received at the handheld device from the display device;
   determining a position on the display device that the handheld device is aimed towards based at least on the determined position or angle of the one or more fiducials in the camera image; and
   controlling an application based on the determined position on the display device.

2. The method of claim 1, further comprising controlling the display device to render the one or more fiducials within a user interface that represents output of the application being controlled.

3. The method of claim 1, wherein the one or more fiducials comprise first and second fiducials.

4. The method of claim 1, wherein the one or more fiducials comprise first through fourth fiducials.

5. The method of claim 1, further comprising:
determining a type of the display device from among multiple, different display device types;
selecting, from among multiple, different filtering techniques, a filtering technique that is suitable for the determined type of the display device; and
applying the selected filtering technique to the captured camera image.

6. The method of claim 1, further comprising:
analyzing a user interface that represents output of the application being controlled for displayed elements that may be used as the one or more fiducials;
selecting the one or more fiducials from the displayed elements within the user interface that represents output of the application being controlled; and
transmitting, to the handheld device, a description of shape and position of the one or more fiducials selected from the displayed elements within the user interface that represents output of the application being controlled.

7. The method of claim 1, wherein the one or more fiducials further comprise one or more corners of a screen of the display device.

8. The method of claim 7, further comprising detecting the one or more corners of the screen based on a difference in brightness or hue.

9. The method of claim 1, wherein the one or more fiducials comprise a user interface control.

10. The method of claim 1, wherein the one or more fiducials comprise a desktop icon.

11. The method of claim 1, wherein the one or more fiducials comprise a video game reference part.

12. The method of claim 1, further comprising accessing, from a memory of the handheld device, information identifying a shape or position of the one or more fiducials.

13. The method of claim 1, further comprising accessing, from a memory of the handheld device, information identifying a timing of a display of the one or more fiducials rendered by the display device.

14. The method of claim 1, further comprising:
determining a type of the display device from among multiple, different display device types;
selecting, from among multiple, different flashing techniques, a flashing technique that is suitable for the determined type of the display device; and
controlling the display device to flash the one or more fiducials on the display device using the selected flashing technique.

15. The method of claim 1, further comprising determining an orientation of the handheld device based at least on the determined position or angle of the one or more fiducials in the camera image, wherein the application is controlled further based on the determined orientation.

16. The method of claim 15, further comprising determining a distance or position of the handheld device, wherein the distance, position, or orientation of the handheld device are determined with respect to the display device.

17. The method of claim 1, further comprising:
capturing, by a second handheld device, a second camera image of the one or more fiducials rendered by the display device;
determining a position or an angle of the one or more fiducials in the second captured camera image; and
determining a second position on the display device that the second handheld device is aimed towards based at least on the determined position or angle of the one or more fiducials in the second camera image,
wherein the application is controlled based on the determined position and the determined second position.

18. The method of claim 17, further comprising:
determining a first distance, position, or orientation of the handheld device with respect to the display device;
determining a second distance, position, or orientation of the second handheld device with respect to the display device; and
determining an identity of a first user and an identity of a second user based on the determined first distance, position, or orientation of the handheld device relative to the determined second distance, position, or orientation of the second handheld device.

19. The method of claim 1, wherein the application comprises a video game application or a media center application.

20. The method of claim 1, wherein controlling the application further comprises changing a view of an avatar in a virtual universe based on determining that an orientation of the handheld device has changed.

21. The method of claim 1, further comprising:
capturing, at the handheld device, a second camera image of the one or more fiducials rendered by the display device;
determining a second position or a second angle of the one or more fiducials in the second captured camera image;
determining a second position on the display device that the handheld device is aimed towards based at least on the determined second position or second angle of the one or more fiducials in the second camera image; and
determining a motion of the handheld device based on comparing the position with the second position,
wherein the application is controlled based on the determined motion.

22. A system comprising:
one or more computers; and
a non-transitory computer-readable medium coupled to the one or more computers having instructions stored thereon which, when executed by the one or more computers, cause the one or more computers to perform operations comprising:
capturing, by a handheld device, a camera image of at least a portion of a display image comprising one or more fiducials, the display image being rendered by a display device,
determining a position or an angle of the one or more fiducials in the captured camera image based at least in part on information about the rendered display image received at the handheld device from the display device,
determining a position on the display device that the handheld device is aimed towards based at least on the determined position or angle of the one or more fiducials in the camera image, and
controlling an application based on the determined position on the display device.

23. A system comprising:
means for capturing, by a handheld device, a camera image of at least a portion of a display image comprising one or more fiducials, the display image being rendered by a display device;
means for determining a position or an angle of the one or more fiducials in the captured camera image, based at least in part on information about the rendered display image received at the handheld device from the display device;

means for determining a position on the display device that the handheld device is aimed towards based at least on the determined position or angle of the one or more fiducials in the camera image; and means for controlling an application based on the determined position on the display device.

24. The system of claim 23, further comprising means for controlling the display device to render the one or more fiducials within a user interface that represents output of the application being controlled.

25. An apparatus comprising:
at least one processor; and
memory storing instructions that, when executed by the at least one processor, cause the apparatus to:
capture, at a handheld device, a camera image of at least a portion of a display image comprising one or more fiducials, the display image being rendered by a display device;
determine a position or an angle of the one or more fiducials in the captured camera image based at least in part on information about the rendered display image received at the handheld device from the display device;
determine a position on the display device that the handheld device is aimed towards based at least on the determined position or angle of the one or more fiducials in the camera image; and
control an application based on the determined position on the display device.

26. The apparatus of claim 25, wherein the memory stores additional instructions that, when executed by the at least one processor, further cause the apparatus to control the display device to render the one or more fiducials within a user interface that represents output of the application being controlled.

* * * * *